US009428675B2

(12) United States Patent
Chi et al.

(10) Patent No.: US 9,428,675 B2
(45) Date of Patent: Aug. 30, 2016

(54) PRESSURE-SENSITIVE ADHESIVE COMPOSITION

(71) Applicant: LG Chem, Ltd., Seoul (KR)

(72) Inventors: Han Na Chi, Daejeon (KR); No Ma Kim, Daejeon (KR); Sung Soo Yoon, Daejeon (KR); Min Ki Lee, Daejeon (KR); Su Jeong Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/559,102

(22) Filed: Dec. 3, 2014

(65) Prior Publication Data

US 2015/0093569 A1    Apr. 2, 2015

Related U.S. Application Data

(63) Continuation of application No. PCT/KR2014/005448, filed on Jun. 19, 2014.

(30) Foreign Application Priority Data

Jun. 19, 2013  (KR) ........................ 10-2013-0070540

(51) Int. Cl.
| | |
|---|---|
| *B32B 7/12* | (2006.01) |
| *C09J 153/00* | (2006.01) |
| *G02B 1/10* | (2015.01) |
| *G02F 1/1335* | (2006.01) |
| *C08F 293/00* | (2006.01) |
| *G02B 5/30* | (2006.01) |

(52) U.S. Cl.
CPC .......... *C09J 153/00* (2013.01); *C08F 293/005* (2013.01); *G02B 1/10* (2013.01); *G02F 1/133528* (2013.01); *C08F 2438/01* (2013.01); *G02B 5/3033* (2013.01); *G02F 2202/28* (2013.01); *Y10T 428/2848* (2015.01); *Y10T 428/2891* (2015.01)

(58) Field of Classification Search
CPC ..................................................... C09J 153/00
See application file for complete search history.

(56) References Cited

U.S. PATENT DOCUMENTS

| | | | |
|---|---|---|---|
| 6,197,883 B1 | 3/2001 | Schimmel et al. | |
| 7,255,920 B2 * | 8/2007 | Everaerts et al. | ..... 428/355 AC |
| 2004/0142193 A1 * | 7/2004 | Husemann et al. | .......... 428/500 |
| 2005/0181148 A1 | 8/2005 | Kim et al. | |
| 2006/0024521 A1 * | 2/2006 | Everaerts et al. | ............ 428/522 |
| 2007/0055006 A1 * | 3/2007 | Kim et al. | ..................... 524/556 |
| 2009/0326155 A1 | 12/2009 | Tomita | |
| 2011/0033720 A1 | 2/2011 | Fujita et al. | |
| 2011/0205469 A1 | 8/2011 | Ha et al. | |
| 2013/0079468 A1 | 3/2013 | Kanemura et al. | |
| 2014/0242303 A1 * | 8/2014 | Lee et al. | ..................... 428/1.55 |
| 2014/0375934 A1 * | 12/2014 | Kim et al. | ..................... 349/96 |
| 2015/0062503 A1 * | 3/2015 | Yoon et al. | ..................... 349/96 |

FOREIGN PATENT DOCUMENTS

| | | |
|---|---|---|
| JP | H07-82542 A | 3/1995 |
| JP | 2006-282687 A | 10/2006 |
| KR | 2002-0010693 A | 2/2002 |
| KR | 2005-0076706 A | 7/2005 |
| KR | 20090031940 A | 3/2009 |
| KR | 2009-0077652 A | 7/2009 |
| KR | 2011-0002857 A | 1/2011 |
| KR | 10-1171976 B1 | 8/2012 |
| KR | 10-1171977 B1 | 8/2012 |
| WO | 2011-152514 A1 | 12/2011 |

OTHER PUBLICATIONS

Donatas, Satas, Handbook of Pressure Sensitive Adhesive Technology, 1999, Satas&Associates, 3rd edition, p. 458.*
Istavan Benedek and Luc Heymans, Pressure SEnsitive Adhesives Technology, 1997, Marcel Dekker, Inc., p. 93.*
International Search Report from PCT/KR2014/005448, dated Sep. 24, 2014.
Written Opinion of the International Searching Authority from PCT/KR2014/005448, dated Sep. 24, 2014.

* cited by examiner

*Primary Examiner* — Hai Vo
*Assistant Examiner* — Anish Desai
(74) *Attorney, Agent, or Firm* — Lerner, David, Littenberg, Krumholz & Mentlik, LLP

(57) ABSTRACT

Provided are a pressure-sensitive adhesive composition, an optical laminate, a pressure-sensitive adhesive polarizing plate and a display device. When a particular block copolymer forming a micro phase separation region in a crosslinking structure is used, and a cohesive strength of the block copolymer is controlled, a pressure-sensitive adhesive composition having excellent physical properties required for an optical member, and particularly having excellent bending preventability, cuttability and pressure-sensitive adhesive durability may be provided. Such a pressure-sensitive adhesive composition may be used for optical uses, for example, to laminate various optical members, or apply an optical member to a display device.

13 Claims, No Drawings

PRESSURE-SENSITIVE ADHESIVE COMPOSITION

CROSS REFERENCE TO RELATED APPLICATIONS

The present application is a continuation of International Application No. PCT/KR2014/005448 filed Jun. 19, 2014, which claims the benefit of the filing date of Korean Patent Application No. 10-2013-0070540 filed Jun. 19, 2013, the disclosures of which are hereby incorporated herein by reference.

FIELD

The present application relates to a pressure-sensitive adhesive composition, an optical laminate, a polarizing plate, and a display device.

BACKGROUND

Various optical members such as a polarizing plate, a retardation plate or a brightness-enhancing film may be applied to a display device such as a liquid crystal display (LCD) device, and a pressure-sensitive adhesive may be used for laminating such optical members on each other or applying such an optical member to the display device, for example, adhering the optical member to a liquid crystal panel.

For example, pressure-sensitive adhesives that can be used with an optical member are disclosed in the patent documents 1 and 2. A pressure-sensitive adhesive used for an optical member requires pressure-sensitive adhesive durability and reliability, workability, or light leakage preventability at high temperature or at high temperature and high humidity.

In addition, according to a recent trend in a thinner display device such as a LCD device, bending preventability has been receiving attention, and other critical physical properties such as durability, an interface adhesive strength and cuttability have been also required.

PRIOR ART DOCUMENTS

Patent Documents

PATENT DOCUMENT 1: Korean Patent No.: 1171976
PATENT DOCUMENT 2: Korean Patent No.: 1171977

DESCRIPTION

Object

The present application is directed to providing a pressure-sensitive adhesive composition, an optical laminate, a pressure-sensitive adhesive polarizing plate, and a display device.

Solution

In one aspect, the present application provides a pressure-sensitive adhesive composition, which includes a block copolymer. The term "block copolymer" used herein may refer to a copolymer including blocks of different polymerized monomers.

The block copolymer may include a first block having a relatively high glass transition temperature and a second block having a relatively low glass transition temperature. The block copolymer including the first and second blocks may form a fine phase separation region in a crosslinking structure of the pressure-sensitive adhesive, and can control physical properties by controlling a glass transition temperature of the block forming each region. For example, in the block copolymer, the first block may have a glass transition temperature of 50° C. or more, and the second block may have a glass transition temperature of −10° C. or less. The "glass transition temperature of a predetermined block" of the block copolymer used herein is a value calculated according to types and ratios of monomers included in the block. In one example, the glass transition temperature of the first block may be 60, 65, 70, or 75° C. or more. In addition, the upper limit of the glass transition temperature of the first block may be, but is not particularly limited to, for example, approximately 95 or 90° C. In addition, in another example, the glass transition temperature of the second block may be −15, −20, −25, or −30° C. or less. The glass transition temperature of the second block may be approximately, for example, −80, −70, −60, or −55° C. or more.

A micro phase separation structure formed by such a block copolymer may exhibit suitable cohesive strength and stress relaxation according to temperature or humidity change, and thus physical properties required for an optical member such as durability and reliability, light leakage preventability, and reworkability may be excellently maintained. In addition, due to the above range of the glass transition temperature of the first block having a relatively high glass transition temperature, stress relaxation may be enhanced, thereby suitably suppressing bending, ensuring a cohesive strength, and stably maintaining other physical properties such as durability.

In one example, the block copolymer may be a crosslinkable copolymer having a crosslinkable functional group. The term "crosslinkable functional group" used herein may refer to a functional group provided to a side chain or terminal end of a polymer, which may react with a functional group of the following multifunctional crosslinking agent. The crosslinkable functional group may be, for example, a hydroxyl group, a carboxyl group, an isocyanate group or a glycidyl group.

In the block copolymer, the crosslinkable functional group may be included in the first and/or second block(s), but including of the crosslinkable functional group at least in the first block may be advantageous for improving an interface adhesive strength through control of a cohesive strength. It is preferable that the crosslinkable functional group is included at least in the first block among the first and second blocks of the block copolymer, and in this case, the second block may or may not include the crosslinkable functional group. In addition, when all of the first and second blocks include crosslinkable functional groups, as will be described below, reactivity of each crosslinkable functional group may be controlled.

The first block may include a polymerization unit of a (meth)acrylic acid ester monomer. The "polymerization unit of a monomer or compound" used herein may refer to the fact that the monomer or compound forms a backbone, such as a main chain or a side chain, of the polymer or a block through a polymerization reaction. As the (meth)acrylic acid ester monomer, for example, an alkyl (meth)acrylate may be used. In one example, in consideration of controlling a cohesive strength, a glass transition temperature and a pressure-sensitive adhesive property, an alkyl (meth)acrylate having an alkyl group having 1 to 20, 1 to 16, 1 to 12, 1 to 8, or 1 to 4 carbon atoms may be used. Such a monomer may be methyl (meth)acrylate, ethyl (meth)acrylate, n-propyl (meth)acrylate, isopropyl (meth)acrylate, n-butyl (meth) acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isobornyl (meth)acrylate, isooctyl (meth)acrylate, isononyl (meth) acrylate, and lauryl (meth)acrylate, which may be used alone or in combination of at least two thereof to ensure the glass transition temperature. Although not particularly limited, in consideration of easy control of a glass transition temperature, as the monomer for forming the first block, among the monomers, an alkyl methacrylate, for example, an alkyl methacrylate having an alkyl group having 1 to 20, 1 to 16, 1 to 12, 1 to 8 or 1 to 4 carbon atoms may be used.

When the crosslinkable functional group is included in the first block, the first block may further include a polymerization unit of a monomer providing a crosslinkable functional group (hereinafter, a crosslinkable monomer). For example, the first block may include a polymerization unit of 80 to 99.9 parts by weight of a (meth)acrylic acid ester monomer such as an alkyl methacrylate and a polymerization unit of 0.1 to 20 parts by weight of a crosslinkable monomer. The unit "parts by weight" used herein may refer to a weight ratio between components. For example, as described above, the expression "the first block includes a polymerization unit of 80 to 99.9 parts by weight of a (meth)acrylic acid ester monomer and a polymerization unit of 0.1 to 20 parts by weight of a crosslinkable monomer" may mean that a weight ratio (A:B) of the (meth)acrylic acid ester monomer (A) forming a polymerized unit of the first block and a crosslinkable monomer (B) is 80 to 99.9:20 to 0.1. In another example, the first block may include a polymerization unit of 85 to 99.9 parts by weight of the (meth)acrylic acid ester monomer such as an alkyl methacrylate and a polymerization unit of 0.1 to 15 parts by weight of the crosslinkable monomer, a polymerization unit of 90 to 99.9 parts by weight of the (meth)acrylic acid ester monomer and a polymerization unit of 0.1 to 10 parts by weight of the crosslinkable monomer, a polymerization unit of 92.5 to 99.75 parts by weight of the (meth)acrylic acid ester monomer and a polymerization unit of 0.25 to 7.5 parts by weight of the crosslinkable monomer, or a polymerization unit of 95 to 99.5 parts by weight of the (meth)acrylic acid ester monomer and a polymerization unit of 0.5 to 5 parts by weight of the crosslinkable monomer. As the cohesive strength of the first block is controlled at a suitable level within such a range, a pressure-sensitive adhesive having excellent cuttability, an interface adhesive strength, durability, and reliability may be formed.

The crosslinkable monomer may be a monomer having a site that can be copolymerized with another monomer included in the block copolymer like the (meth)acrylic acid ester monomer, and the above-described crosslinkable functional groups, for example, a hydroxyl group. In the preparation of a pressure-sensitive adhesive, various crosslinkable monomers described above are known, and may be used in the polymer. For example, the copolymerizable monomer having a hydroxyl group may be, but is not limited to, a hydroxyalkyl (meth)acrylate such as 2-hydroxyethyl (meth) acrylate, 2-hydroxypropyl (meth)acrylate, 4-hydroxybutyl (meth)acrylate, 6-hydroxyhexyl (meth)acrylate or 8-hydroxyoctyl (meth)acrylate, or a hydroxyalkyleneglycol (meth)acrylate such as 2-hydroxyethyleneglycol (meth) acrylate or 2-hydroxypropyleneglycol (meth)acrylate. In consideration of reactivity with a different monomer for forming the second block and easy control of a glass transition temperature, among the monomers described above, a hydroxyalkyl acrylate or hydroxyalkyleneglycol acrylate may be used, but the present application is not limited thereto.

The second block of the block copolymer may further include a polymerization unit of a (meth)acrylic acid ester monomer, for example, in consideration of easy control of a glass transition temperature, an alkyl acrylate of the monomers used in the first block such as an alkyl acrylate having an alkyl group having 1 to 20, 1 to 16, 1 to 12, 1 to 8 or 1 to 4 carbon atoms. When a crosslinkable functional group is included in the second block, the second block may further include a polymerization unit of the crosslinkable monomer. For example, the second block may include a polymerization unit of 80 to 99.9 parts by weight of the (meth)acrylic acid ester monomer such as an alkyl methacrylate and a polymerization unit of 0.1 to 20 parts by weight of the crosslinkable monomer, or a polymerization unit of 90 to 99.9 parts by weight of the (meth)acrylic acid ester monomer and a polymerization unit of 0.1 to 10 parts by weight of the crosslinkable monomer. A type of the crosslinkable monomer is not particularly limited, and a suitable type may be selected from the types described in the first block and used.

When all of the first and second blocks include crosslinkable functional groups, as the crosslinkable monomer, different monomers may be included in the first and second blocks, respectively. For example, monomers having different reactivities to the following multifunctional crosslinking agent may be included in the first and second blocks, respectively, and as an example, the crosslinkable functional group included in the first block may be relatively more slowly crosslinked than the crosslinkable functional group included in the second block. There are various methods of providing a different reaction speed to the same crosslinking agent, and in one example, there is a method of controlling a length of a linker connecting the crosslinkable functional group to a main chain of the copolymer. For example, when a monomer having a hydroxyl group is used for the first and second blocks, a monomer of Formula 1 may be used.

[Formula 1]

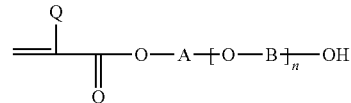

In Formula 1, Q is hydrogen or an alkyl group, A and B are each independent linear alkylene groups, and n is an optional number, for example, a number of 0 to 10.

In Formula 1, when there are at least two [—O—B—] units, the number of carbon atoms of B in each unit may be the same or different.

In Formula 1, the alkyl group may be a linear, branched, or cyclic alkyl group having 1 to 20, 1 to 16, 1 to 12, 1 to 8, or 1 to 4 carbon atoms.

In Formula 1, the linear alkylene group may be, for example, a linear alkylene group having 1 to 20, 1 to 16, 1 to 12, 1 to 8, or 1 to 4 carbon atoms.

The alkyl group or alkylene group may be substituted by an optional substituent.

The compound of Formula 1 may be, but is not limited to, 2-hydroxyethyl (meth)acrylate, 2-hydroypropyl (meth)acrylate, 4-hydroxybutyl (meth)acrylate, 6-hydroxyhexyl (meth)

acrylate, 8-hydroxyoctyl (meth)acrylate, 2-hydroxyethyleneglycol (meth)acrylate, or 2-hydroxypropyleneglycol (meth)acrylate.

In the block copolymer, the number of carbon atoms (hereinafter, the number of carbon atoms of a side chain of the first block) included in linear alkylene groups of A and B of the compound of Formula 1 included in the first block may be smaller than the number of carbon atoms (hereinafter, the number of carbon atoms of a side chain of the second block) included in linear alkylene groups of A and B of the compound of Formula 1 included in the second block, for example, the number of carbon atoms of a side chain of the first block may be 1 to 3, and the number of carbon atoms of a side chain of the second block may be 4 to 10, 4 to 9, 4 to 8, 4 to 7 or 4 to 6. When the number of carbon atoms is controlled within the above range, it may be advantageous in that a suitable cohesive strength is provided to the first and second blocks, and cuttability, an interface adhesive strength, bending preventability, and durability are controlled. Here, to calculate the numbers of carbon atoms of the side chains of the first and second blocks, when substituents including different carbons may be substituted to the linear alkylene groups of A and B, only the number of carbons included in the linear alkylene groups are considered.

The first block and/or the second block may further include, when needed, for example, another optional comonomer to control a glass transition temperature, and the monomer may be included as a polymerization unit. The comonomer may be, but is not limited to, a nitrogen-containing monomer such as (meth)acrylonitrile, (meth)acrylamide, N-methyl (meth)acrylamide, N-butoxy methyl (meth)acrylamide, N-vinyl pyrrolidone, or N-vinyl caprolactam; an alkylene oxide-containing monomer such as an alkoxy alkyleneglycol (meth)acrylic acid ester, an alkoxy dialkyleneglycol (meth)acrylic acid ester, an alkoxy trialkyleneglycol (meth)acrylic acid ester, an alkoxy tetraalkyleneglycol (meth)acrylic acid ester, an alkoxy polyethyleneglycol (meth)acrylic acid ester, a phenoxy alkyleneglycol (meth)acrylic acid ester, a phenoxy dialkyleneglycol (meth)acrylic acid ester, a phenoxy trialkyleneglycol (meth)acrylic acid ester, a phenoxy tetraalkyleneglycol (meth)acrylic acid ester or a phenoxy polyalkyleneglycol (meth)acrylic acid ester; a styrene-based monomer such as styrene or methyl styrene; a glycidyl-containing monomer such as glycidyl (meth)acrylate; or a carboxyl acid vinyl ester such as vinyl acetate. One or at least two suitable types of the comonomers may be included in the polymer. Such a comonomer may be included in a block copolymer in a ratio of, for example, 20 parts by weight or less, or 0.1 to 15 parts by weight with respect to a weight of another monomer in each block.

The block copolymer may include, for example, 100 to 1,500 parts by weight of the second block with respect to 100 parts by weight of the first block. The second block may be included, in another example, at 200, 300, 400, 500, 600, 700 or 800 parts by weight or more with respect to 100 parts by weight of the first block. The second block may be included at 1,400, 1,300, 1,200, 1,100 or 1,000 parts by weight or less with respect to 100 parts by weight of the first block. If a weight ratio of the first block and the second block is controlled as described above, a pressure-sensitive adhesive composition and a pressure-sensitive adhesive having excellent physical properties may be provided.

In the block copolymer, the first block may have a number average molecular weight ($M_n$) of, for example, 3,000 to 200,000. The number average molecular weight of the first block may refer to a number average molecular weight of a polymer prepared by polymerizing only a monomer for forming the first block. The "number average molecular weight" described herein may be measured by, for example, a method described in Examples below using gel permeation chromatography (GPC). In another example, the number average molecular weight of the first block may be 5,000, 7,000, 9,000, 11,000, 13,000, 15,000, 17,000, 19,000, 21,000, 23,000, or 25,000 or more. In addition, the number average molecular weight of the first block may be, in another example, 150,000, 100,000, 90,000, 80,000, 70,000, 60,000, 50,000, 40,000, or 35,000 or less. In addition, the first block may have a polydispersity index (PDI; Mw/Mn), that is, a ratio (Mw/Mn) of a weight average molecular weight (Mw) to a number average molecular weight (Mn) of approximately 1.0 to 2.0 or 1.0 to 1.7. The block copolymer may have a number average molecular weight of 3,000 to 300,000. The number average molecular weight of the block copolymer may be, in another example, 5,000, 10,000, 20,000, 30,000, 40,000, 50,000, 70,000, 90,000, or 100,000 or more. In addition, the number average molecular weight of the block copolymer may be, in another example, 250,000, 200,000, or 160,000 or less. The polydispersity index (PDI; Mw/Mn) of the block copolymer may be in a range of approximately 1.0 to 3.0 or 1.5 to 2.5. A pressure-sensitive adhesive composition or pressure-sensitive adhesive having excellent physical properties may be provided by controlling a molecular weight characteristic as described above.

In one example, the block copolymer may be a diblock copolymer including the first and second blocks, that is, a block copolymer including only two blocks such as the first and second blocks. As the diblock copolymer is used, it may be more preferable for durability and reliability, stress relaxation, bending preventability, cuttability, and reworkability of the pressure-sensitive adhesive.

A method of preparing a block copolymer may be a conventional method without particular limitation. The block polymer may be polymerized by living radical polymerization (LRP), for example, a suitable one selected from anion polymerization for synthesis in the presence of an alkali metal or an inorganic salt such as an alkali earth metal salt using an organic rare earth metal complex or an organic alkali metal compound as a polymerization initiator, anion polymerization for synthesis in the presence of an organic aluminum compound using an organic alkali metal compound as a polymerization initiator, atom-transfer radical polymerization (ATRP) using an atom-transfer radical polymerizer as a polymerization controller, activators regenerated by electron transfer (ARGET) ATRP for synthesis in the presence of an organic or inorganic reducing agent generating electrons using an atom-transfer radical polymerizer as a polymerization controller, initiators for continuous activator regeneration (ICAR) ATRP, reversible addition fragmentation chain transfer (RAFT) polymerization using an inorganic reducing agent addition-opening chain transferring agent, and a method using an organic tellurium compound as an initiator.

The pressure-sensitive adhesive composition according to the present application may further include a multifunctional crosslinking agent. The term "multifunctional crosslinking agent" may refer to a compound including at least two functional groups that can react with a crosslinkable functional group of a block copolymer. The multifunctional crosslinking agent may be included at, for example, 0.01 to 10, 0.01 to 8, 0.01 to 6, 0.01 to 4, 0.01 to 2, 0.01 to 1 or 0.01 to 0.5 parts by weight with respect to 100 parts by weight of the block copolymer. Such a range may be advantageous to suitably maintain the cohesive strength of the pressure-sensitive adhesive, thereby achieving desired physical properties, and ensuring stability of the physical properties of the pressure-sensitive adhesive over time.

As the multifunctional crosslinking agent, in consideration of a type of the crosslinkable functional group of the block copolymer, a known compound may be used, and thus a conventional crosslinking agent such as an isocyanate-based compound, an epoxy-based compound, an aziridine-based compound, or a metal chelate-based compound may be used.

Here, as the isocyanate-based compound, a reaction product of a diisocyanate compound and a polyol, an isocyanurate adduct of a diisocyanate compound, triisocyanatephenyl thiophosphate, 2,4,6-triisocyanatetoluene, 1,3,5-triisocyanatebenzene, or 4,4',4"-triphenylmethanetriisocyanate may be used, as the epoxy-based compound, at least one selected from the group consisting of ethyleneglycol diglycidylether, triglycidylether, trimethylolpropane triglycidylether, N,N,N',N'-tetraglycidyl ethylenediamine and glycerine diglycidylether, may be used, as an ariridine crosslinking agent, N,N'-toluene-2,4-bis(1-aziridinecarboxide), N,N'-diphenylmethane-4,4'-bis(1-aziridinecarboxide), triethylene melamine, bisisoprotaloyl-1-(2-methylaziridine), and tri-1-aziridinylphosphineoxide, may be used, and as a metal chelate-based compound, a compound in which a polyvalent metal such as aluminum, iron, zinc, tin, titanium, antimony, magnesium and/or vanadium is coordinated to acetyl acetone or ethyl acetoacetate, may be used, but the present application is not limited thereto. The pressure-sensitive adhesive composition may further include a silane coupling agent. As the silane coupling agent, for example, a silane coupling agent having a β-cyano group or an acetoacetyl group may be used. For example, such a silane coupling agent may allow a pressure-sensitive adhesive formed by a copolymer having a low molecular weight to exhibit excellent cohesive property and adhesive stability, and to excellently maintain durability and reliability under conditions of wet-heat resistance and heat resistance.

As the silane coupling agent having a β-cyano group or an acetoacetyl group, for example, a compound represented by Formula 2 or 3 may be used.

$(R_1)_n Si(R_2)_{(4-n)}$ [Formula 2]

$(R_3)_n Si(R_2)_{(4-n)}$ [Formula 3]

In Formula 2 or 3, $R_1$ is a β-cyanoacetyl group or a β-cyanoacetylalkyl group, $R_3$ is an acetoacetyl group or an acetoacetylalkyl group, $R_2$ is an alkoxy group, and n is a number of 1 to 3.

In Formula 2 or 3, the alkyl group may be an alkyl group having 1 to 20, 1 to 16, 1 to 12, 1 to 8, or 1 to 4 carbon atoms, and such an alkyl group may be a linear, branched, or cyclic type.

In Formula 2 or 3, the alkoxy group may be an alkoxy group having 1 to 20, 1 to 16, 1 to 12, 1 to 8, or 1 to 4 carbon atoms, and such an alkoxy group may be a linear, branched, or cyclic type.

In Formula 2 or 3, n may be, for example, 1 to 3, 1 to 2, or 1.

The compound of Formula 2 or 3 may be, but is not limited to, for example, acetoacetylpropyl trimethoxy silane, acetoacetylpropyl triethoxy silane, β-cyanoacetylpropyl trimethoxy silane, or β-cyanoacetylpropyl triethoxy silane.

In the pressure-sensitive adhesive composition, the silane coupling agent may be included at 0.01 to 5 or 0.01 to 1 part by weight with respect to 100 parts by weight of the block copolymer, and within such a range, desired physical properties may be effectively provided to the pressure-sensitive adhesive.

The pressure-sensitive adhesive composition may further include a tackifier when needed. The tackifier may be, but is not limited to, a hydrocarbon resin or a hydrogenated product thereof, a rosin resin or a hydrogenated product thereof, a rosin ester resin or a hydrogenated product thereof, a terpene resin or a hydrogenated product thereof, a terpene phenol resin or a hydrogenated product thereof, a polymerized rosin resin, or a polymerized rosin ester resin, which may be used alone or in combination of at least two thereof. The tackifier may be included in the pressure-sensitive adhesive composition at 100 parts by weight or less with respect to 100 parts by weight of the block copolymer.

The pressure-sensitive adhesive composition may further include at least one additive selected from the group consisting of an epoxy resin, a curing agent, a UV stabilizer, an antioxidant, a coloring agent, a reinforcing agent, a filler, a foaming agent, a surfactant, and a plasticizer when needed.

The pressure-sensitive adhesive composition may be a pressure-sensitive adhesive composition for an optical member. The pressure-sensitive adhesive composition for an optical member may be used to, for example, laminate an optical film such as a retardation film, an antiglare film, a wide viewing angle compensation film or a brightness-enhancing film, or adhere the optical film or a laminate thereof to an adherend such as a liquid crystal panel. In one example, the pressure-sensitive adhesive composition may be a pressure-sensitive adhesive composition for a polarizing plate, which is used to adhere a polarizer to a liquid crystal panel.

In another aspect, the present application provides a pressure-sensitive adhesive optical laminate. The optical laminate may include an optical film; and a pressure-sensitive adhesive layer formed on one or both surface(s) of the optical film. The pressure-sensitive adhesive layer may be, for example, a pressure-sensitive adhesive layer to adhere the optical film to a liquid crystal panel of an LCD device or another optical film. In addition, the pressure-sensitive adhesive layer may include the above-described pressure-sensitive adhesive composition of the present application. The pressure-sensitive adhesive composition may be included in the pressure-sensitive adhesive layer while a crosslinking structure is implemented. Here, as the optical film, a polarizer, a retardation film, a brightness-enhancing film, or a laminate in which at least two thereof are laminated may be used.

In still another aspect, the present application provides a pressure-sensitive adhesive polarizing plate. The polarizing plate may have, for example, a structure in which the optical film is a polarizer in the pressure-sensitive adhesive optical laminate.

A type of the polarizer included in the polarizing plate is not particularly limited, and thus for example, a general type known in the art such as a polyvinyl alcohol-based polarizer may be employed without limitation.

The polarizer is a functional film that can extract only light oscillating in one direction from incident light oscillating in various directions. Such a polarizer may be, for example, a form in which a dichroic dye is adsorbed and oriented on a polyvinyl alcohol-based resin film. The polyvinyl alcohol-based resin constituting the polarizer may be obtained by, for example, gelating a polyvinylacetate-based resin. In this case, in the polyvinylacetate-based resin that can be used, in addition to a homopolymer of vinyl acetate, a polymer of vinyl acetate and a different monomer copolymerizable therewith may be included. Here, an example of a monomer that can be copolymerized with vinyl acetate may be, but is not limited to, one or a combination of at least two of unsaturated carbonic acids, olefins, vinyl ethers, unsaturated sulfonic acids, and acrylamides having an ammonium group. A degree of gelation of the polyvinyl alcohol-based resin may be approximately 85 to 100 mol %, and preferably 98 mol % or more. The polyvinyl alcohol-based resin may be further modified, and for example, polyvinyl formal or polyvinyl acetal modified by aldehydes may also be used. In addition, a degree of polymerization of the polyvinyl alcohol-based resin may be approximately 1,000 to 10,000, and preferably 1,500 to 5,000.

The polarizer may be formed by a process of elongating (e.g., uniaxial elongation) the polyvinyl alcohol-based resin film, a process of dying the polyvinyl alcohol-based resin film with a dichroic dye and adsorbing the dichroic dye, a process of treating the polyvinyl alcohol-based resin film to which the dichroic dye is adsorbed with a boric acid aqueous solution, and a process of washing the polyvinyl alcohol-based resin film after treated with the boric acid aqueous solution. Here, as the dichroic dye, iodine or a dichroic organic dye may be used.

The polarizing plate may further include a protective film adhered to one or both surfaces of the polarizer, and in this case, the pressure-sensitive adhesive layer may be formed on one surface of the protective film. A type of the protective film is not particularly limited, and one or a laminate including at least two of, for example, a cellulose-based film such as triacetyl cellulose (TAC); a polyester-based film such as a polycarbonate film or poly(ethyleneterephthalate) (PET) film; a polyethersulfone-based film; a polyethylene film, a polypropylene film, and a polyolefin-based film formed of a resin having a cyclic or norbornene structure or an ethylene-propylene polymer may be used.

The polarizing plate may further include at least one functional layer selected from the group consisting of a protective layer, a reflective layer, a glare-proof layer, a retardation plate, a wide viewing angle compensation film, and a brightness-enhancing film.

In the present application, a method of forming a pressure-sensitive adhesive layer on the polarizing plate or optical film may be, but is not particularly limited to, for example, directly coating the pressure-sensitive adhesive composition on a polarizing plate or optical film and curing the coated composition to implement a crosslinking structure, or coating the pressure-sensitive adhesive composition on a release-treated surface of a releasing film, curing the coated composition to form a crosslinking structure, and transferring the cured result to a polarizing plate or optical film.

Here, a method of coating the pressure-sensitive adhesive composition may be, but is not particularly limited to, a method of coating the pressure-sensitive adhesive composition using a conventional means such as a bar coater.

For a uniform coating process, a multifunctional crosslinking agent included in the pressure-sensitive adhesive composition may be adjusted to prevent a crosslinking reaction with a functional group, and therefore, the crosslinking agent may form a crosslinking structure during curing and aging processes after coating, thereby enhancing a cohesive strength, a pressure-sensitive adhesive property and cuttability of a pressure-sensitive adhesive.

The coating process may also be performed after sufficiently removing a volatile component in the pressure-sensitive adhesive composition or a bubbling component such as a reaction residue, and therefore, it may prevent a decrease in a modulus of elasticity due to excessively low crosslinking density or molecular weight of the pressure-sensitive adhesive, and a scatterer that may be formed therein due to growing bubbles between a glass plate and a pressure-sensitive adhesive layer at a high temperature.

After the coating process, a method of implementing a crosslinking structure by curing the pressure-sensitive adhesive composition may be, but is not particularly limited to, a method of maintaining a coating layer at a suitable temperature to induce a crosslinking structure of a block copolymer and a multifunctional crosslinking agent, which are included in the coating layer.

In yet another aspect, the present application provides a display device, which includes the optical laminate or a polarizing plate. As a representative example of the display device, an LCD device is used. The exemplary display device is an LCD device, which may include a liquid crystal panel, and the polarizing plate or optical laminate adhered to one or both surfaces of the liquid crystal panel. The polarizing plate or optical laminate may be adhered to the liquid crystal panel using the above-described pressure-sensitive adhesive.

As the liquid crystal panel, for example, a known panel such as a twisted nematic (TN)-mode, super twisted nematic (STN)-mode, ferroelectric (F)-mode, and polymer dispersed LCD (PD LCD)-mode panel; all types of active matrix panels including a two terminal-mode and three terminal-mode panel; an in-plane switching (IPS)-mode panel; and a vertically aligned (VA)-mode panel may be applied.

In addition, types of other components of the LCD device, for example, upper and lower substrates such as a color filter substrate or an array substrate are not particularly limited, either, and any components known in the art may be employed without limitation.

Effect

In the present application, when a particular block copolymer forming a micro phase separation region in a crosslinking structure is used, and a cohesive strength of the block copolymer is controlled, a pressure-sensitive adhesive composition having excellent physical properties required for an optical member, and particularly having excellent bending preventability, cuttability and pressure-sensitive adhesive durability can be provided. Such a pressure-sensitive adhesive composition can be used for optical uses, for example, to laminate various optical members, or apply an optical member to a display device.

ILLUSTRATIVE EMBODIMENTS

Hereinafter, a pressure-sensitive adhesive composition will be described in detail with reference to examples and comparative examples, but the scope of the pressure-sensitive adhesive composition is not limited to the following examples.

Physical properties presented in examples and comparative examples were evaluated by the following methods.

1. Evaluation of Number Average Molecular Weight and Polydispersity Index

A number average molecular weight (Mn) and a polydispersity index (PDI) were measured under the following conditions using GPC, standard polystyrene produced by Agilent System was used to draw a calibration curve, and measurement results were obtained.

<Measurement Conditions>

Measuring Tool: Agilent GPC (Agilent 1200 series, U.S.)
Column: Two connected PL mixed B
Column Temperature: 40° C.
Eluent: Tetrahydrofuran (THF)
Flow Rate: 1.0 mL/min
Concentration: ~1 mg/mL (100 µL injection)

2. Evaluation of Interface Adhesive Strength

A specimen was formed by cutting a polarizing plate formed in Examples or Comparative Examples to have a size of 25 mm×100 mm (width×length). Afterward, the specimen was adhered to a poly(ethylene terephthalate) (PET) film via a pressure-sensitive adhesive layer to form a laminate, the laminate was maintained at room temperature for 3 days and adhered to a glass substrate with a double-sided tape to dispose the PET film on the laminate. An adhesive strength between the polarizing plate and the PET film was measured by peeling the PET film at room temperature at a peel-off rate of 10 mm/sec and a peel-off angle of 180 degrees, and thus an interface adhesive strength was evaluated.

3. Evaluation of Cuttability

A degree of sagging or leaking of a pressure-sensitive adhesive was observed with the naked eye by cutting a polarizing plate formed in Examples or Comparative Examples with a cutter, and evaluated according to the following criteria.

<Evaluation Criteria>

A: Sagging and leaking of the pressure-sensitive adhesive was not observed.

B: Sagging and/or leaking of the pressure-sensitive adhesive was observed slightly.

C: Sagging and/or leaking of the pressure-sensitive adhesive was much observed.

4. Evaluation of Durability

A polarizing plate formed in Examples or Comparative Examples was cut to a size of approximately 180 mm×320 mm (width×length) to prepare a specimen, and then the specimen was adhered to a commercially-available 19-inch panel. Afterward, the panel was stored in an autoclave (50° C., 5 atm) for approximately 20 minutes, thereby preparing a sample. Humidity and heat resistances and durability of the prepared sample were evaluated under the following criteria by maintaining the sample at 60° C., and a relative humidity of 90% for 500 hours, and observing generation of bubbles and peeling at a pressure-sensitive adhesive interface. Heat resistance and durability were evaluated under the following criteria by maintaining the sample at 80° C. for 500 hours, and observing generation of bubbles and peeling.

<Evaluation Criteria>

A: There were no bubbles or peeling.

B: There were some bubbles and/or peeling.

C: There was a great amount of bubbles and/or peeling.

5. Calculation of Glass Transition Temperature

A glass transition temperature (Tg) of each block of a block copolymer was calculated according to the following equation.

<Equation>

$$1/Tg = \Sigma Wn/Tn$$

In the equation, Wn was a weight fraction of a monomer used in each block, and Tn was a glass transition temperature detected when the used monomer formed a homopolymer.

That is, in the equation, the right side was a result obtained by summing values (Wn/Tn) obtained by dividing a weight fraction of the used monomer by a glass transition temperature detected when each monomer formed a homopolymer.

6. Measurement of Conversion Ratio and Component Ratio of Monomer

A conversion ratio in a polymerization process of a main monomer for forming a first block, methyl methacrylate (MMA), and a main monomer for forming a second block, butyl acrylate (BA), in a block copolymer of Examples or Comparative Examples and component contents in the block copolymer, were calculated by the following equation according to the 1H-NMR result.

<MMA Conversion Ratio>

$$\text{MMA conversion ratio}(\%) = 100 \times B/(A+B)$$

Here, A was an area of a peak (approximately 3.4 to 3.7 ppm) derived from a methyl group induced from MMA included in a polymer in a 1H-NMR spectrum, and B was an area of a peak (approximately 3.7 ppm) derived from a methyl group of MMA which was not polymerized. That is, in consideration of a migration position of a methyl group peak in the MMA structure, a conversion ratio of the monomer was calculated.

<BA Conversion Ratio>

$$\text{BA conversion ratio}(\%) = 100 \times C/(C+D)$$

Here, D was an area of a peak (approximately 5.7 to 6.4 ppm) derived from $=CH_2$ at a double bonded terminal end of BA in the 1H-NMR spectrum, and C was an area of a peak (approximately 3.8 to 4.2 ppm) derived from $—OCH_2—$ present in a polymer formed by polymerization of BA. That is, the BA conversion ratio was measured by calculating relative values of the $=CH_2$ peak formed by a double bond of BA and the $—OCH_2—$ peak of the polymer.

<Estimation of Component Ratio>

Ratios of the first block and the second block of the block copolymer were calculated by the following equation based on ratios of MMA and BA, which were main monomers used to form the first and second blocks.

<Equation>

$$\text{Content ratio}(\%) \text{ of MMA in block copolymer} = 100 \times \text{MMA peak area/BA peak area}$$

Here, the MMA peak area was an area value per 1H proton of a peak detected at approximately 3.4 to 3.7 ppm in 1H NMR (the peak observed in $—CH_3$ derived from MMA), and the BA peak area was an area value per 1H proton of a peak detected at approximately 3.8 to 4.2 ppm in 1H NMR (the peak observed in $—OCH_2—$ present in a polymer formed by BA).

That is, the weight ratios of the first block and the second block were estimated by calculating relative values of the $—CH_3$ peak of the MMA structure and the $—OCH_2—$ peak of the polymer formed from BA.

7. Coating Content

A coating content was evaluated by the following method.

<Sequence of Measuring Coating Content>

1) A weight (A) of an aluminum dish was measured.

2) A pressure-sensitive adhesive composition of Examples or Comparative Examples was taken at an amount of approximately 0.3 to 0.5 g (sample before drying), and placed in the aluminum dish.

3) A polymerization inhibitor (hydroquinone) solution (concentration: 0.5 wt %) dissolved in ethyl acetate was added to a very small amount of a pressure-sensitive adhesive composition using a pipette.

4) The resulting mixture was dried in an oven at 150° C. for 30 minutes to remove a solvent.

5) The resulting product was cooled at room temperature for approximately 15 to 30 minutes, and then a weight (weight of a sample after drying) of a remaining component was measured.

6) According to the measuring result, a coating content was evaluated by the following equation.

<Equation>

$$\text{Coating content}(\text{unit}:\%) = 100 \times (DS-A)/(S+E)$$

DS: weight (A) of aluminum dish+weight of sample after drying (unit: g)
A: weight of aluminum dish (unit: g)
S: weight of sample before drying (unit: g)
E: weight of removed component (solvent, etc.) (unit: g)
8. Evaluation of Viscosity Viscosity was evaluated by the following method using a Brookfield digital viscometer (DV-I+, DV-II+Pro).

<Sequence of Measuring Viscosity>

1) 180 mL of a sample was put in a beaker, and maintained under constant temperature/constant humidity (23° C./50% relative humidity) conditions for approximately 1 hour to remove bubbles.

2) A spindle was put in the sample at an angle not to have bubbles such that a liquid surface of the sample was not lower than a groove of the spindle.

3) The spindle was connected to a viscometer, and adjusted such that the groove of the spindle matched the liquid surface of the sample.

4) A set speed key was pressed to choose RPM of the spindle.

5) A motor on/off key was pressed to operate the viscometer.

After a viscosity shown on a screen was stabilized, a value was obtained. The RPM at which a confidence interval was approximately 10% or more was detected on the display and fixed, thereby measuring a viscosity.

Preparation Example 1

Preparation of Block Copolymer (A1)

A monomer mixture including MMA, butyl methacrylate (BMA) and hydroxyethyl methacrylate (HEMA) in a weight ratio of 7:2:1 (MMA:BMA:HEMA) as a monomer for forming a first block was mixed with suitable amounts of ethyl 2-bromoisobutyrate (EBiB) and ethyl acetate (EAc). A flask containing the mixture was sealed with a rubber membrane, nitrogen purging and stirring were performed at approximately 25° C. for approximately 30 minutes, and remaining oxygen was removed by bubbling. Afterward, a mixture of $CuBr_2$, tris(2-pyridylmethyl)amine (TPMA) and 2,2'-azobis(2,4-dimethyl valeronitrile) (V-65), from which the suitable amount of oxygen was removed, was added and dipped in a reaction vessel at approximately 67° C. to initiate a reaction (polymerization of the first block). When a conversion ratio of MMA approached approximately 75%, a mixture for forming a second block previously bubbled with nitrogen was added in the presence of nitrogen. The mixture for forming the second block was prepared by dissolving BA and hydroxybutyl acrylate (HBA) in a solvent such as ethyl acetate EAc in a weight ratio of 90:10 (BA:HBA) as a monomer mixture. Afterward, suitable amounts of $CuBr_2$, TPMA and V-65 were further added in a reaction flask, and a chain extension reaction was performed (polymerization of second block). When a conversion ratio of the monomer (BA) approached 80% or more, the reaction mixture was exposed to oxygen and diluted in a suitable solvent to terminate the reaction, resulting in a block copolymer (in this process, V-65 was divided into suitable portions and added until the time at which the reaction was terminated in consideration of a half life of V-65).

Preparation Examples 2 to 6

Preparation of Block Copolymers (A2, A3 and B1 to B3)

Block copolymers were prepared by the same method as described in Preparation Example 1, except that monomers used in polymerization of first and second blocks and ratios thereof were controlled as shown in Table 1. EBiB, EA, $CuBr_2$, TPMA, and V-65 corresponding to a catalyst, a solvent, and an initiator in the preparation of the block copolymer, respectively, were added at a suitable amount in consideration of polymerization efficiency.

TABLE 1

|     |    | Ingredients of first block (weight ratio) | | | Ingredients of second block (weight ratio) | |
|-----|----|------|------|------|------|------|
|     |    | MMA  | BMA  | HEMA | BA   | HBA  |
| BCP | A1 | 70   | 20   | 10   | 90   | 10   |
|     | A2 | 70   | 25   | 5    | 90   | 10   |
|     | A3 | 70   | 29.5 | 0.5  | 90   | 10   |
|     | B1 | 70   | 30   |      | 90   | 10   |
|     | B2 | 70   |      | 30   | 90   | 10   |
|     | B2 | 100  |      |      | 90   | 10   |

Weight ratio: ratio when total of weights of monomers was set to 100
MMA: methyl methacrylate (homopolymer Tg: approximately 110° C.)
BMA: butyl methacrylate(homopolymer Tg: approximately 27° C.))
HEMA: 2-hydroxyethyl methacrylate (homopolymer Tg: approximately 55° C.)
BA: butyl acrylate (homopolymer Tg: approximately −45° C.)
HBA: 4-hydroxybutyl acrylate (homopolymer Tg: approximately −80° C.)

Characteristics of the block copolymer prepared by the above method are shown in Table 2.

TABLE 2

| | | Block copolymer | | | | | |
|---|---|---|---|---|---|---|---|
| | | A1 | A2 | A3 | B1 | B2 | B3 |
| First block | MMA ratio | 70 | 70 | 70 | 70 | 70 | 100 |
| | BMA ratio | 20 | 25 | 29.5 | 30 | 0 | 0 |
| | HEMA ratio | 10 | 5 | 0.5 | | 30 | 0 |
| | Mn (×10$^4$) | 2.9 | 2.4 | 2.1 | 2.2 | 2.6 | 2.3 |
| | Tg (° C.) | | | | | | |
| | PDI | 1.38 | 1.34 | 1.38 | 1.36 | 1.36 | 1.36 |
| Second block | BA ratio | 90 | 90 | 90 | 90 | 90 | 90 |
| | HBA ratio | 10 | 10 | 10 | 10 | 10 | 10 |
| | Tg (° C.) | | | | | | |
| Block copolymer | Mn (×10$^4$) | 12.3 | 12.5 | 13.1 | 12.2 | 12.2 | 12.4 |
| | PDI | 2.4 | 2.2 | 2.4 | 2.1 | 2.3 | 2.1 |
| | First block:Second block (weight ratio) | 10:90 | 10:90 | 10:90 | 10:90 | 15:85 | 10:90 |

Weight ratio: ratio when total of weights of monomers was set to 100
MMA: methyl methacrylate (homopolymer Tg: approximately 110° C.)
BMA: butyl methacrylate(homopolymer Tg: approximately 27° C.)
HEMA: 2-hydroxyethyl methacrylate (homopolymer Tg: approximately 55° C.)
BA: butyl acrylate (homopolymer Tg: approximately −45° C.)
HBA: 4-hydroxybutyl acrylate (homopolymer Tg: approximately −80° C.)
Tg: glass transition temperature
Mn: number average molecular weight
PDI: polydispersity index Example 1

Preparation of Coating Solution (Pressure-Sensitive Adhesive Composition)

A coating solution (pressure-sensitive adhesive composition) was prepared by mixing 0.07 parts by weight of a crosslinking agent (Coronate L, NPU, Japan), 0.1 parts by weight of dibutyltin dilaurate (DBTDL) and 0.2 parts by weight of a silane coupling agent having a beta-cyanoacetyl group, and combining with EAc as a solvent.

Preparation of Pressure-Sensitive Adhesive Polarizing Plate

The prepared coating solution was coated on a release-treated surface of a release-treated release poly(ethylene terephthalate) (PET) (MRF-38, Mitsubishi Group) having a thickness of 38 μm such that a thickness after drying became approximately 23 μm, and maintained in an oven at 110° C. for approximately 3 minutes. After drying, a coating layer formed on the release PET was laminated on a WV liquid crystal layer of a polarizing plate (laminate of TAC/PVA/TAC:TAC=triacetylcellulose, PVA=polyvinylalcohol-based polarizing film) on one side of which a wide view (WV) liquid crystal layer was coated, thereby preparing a pressure-sensitive adhesive polarizing plate.

Examples 2 and 3 and Comparative Examples 1 to 3

A pressure-sensitive adhesive composition (coating solution) and a pressure-sensitive adhesive polarizing plate were formed by the same method as described in Example 1, except that components and ratios in preparation of the pressure-sensitive adhesive composition (coating solution) were controlled as shown in Table 3.

TABLE 3

|  |  | Example | | | Comparative Example | | |
|---|---|---|---|---|---|---|---|
|  |  | 1 | 2 | 3 | 1 | 2 | 3 |
| Block copolymer | Type | A1 | A2 | A3 | B1 | B2 | B3 |
|  | Content | 100 | 100 | 100 | 100 | 100 | 100 |
| Content of crosslinking agent |  | 0.2 | 0.1 | 0.05 | 0.05 | 0.2 | 0.05 |
| Content of crosslinking agent |  | 0.1 | 0.1 | 0.1 | 0.1 | 0.1 | 0.1 |
| SCA content |  | 0.2 | 0.2 | 0.2 | 0.2 | 0.2 | 0.2 |
| Coating solid content |  | 30 | 30 | 30 | 30 | 30 | 30 |
| Viscosity of coating solution (23° C.) |  | 1860 | 1760 | 1700 | 1650 | 1920 | 1770 |

Content unit: parts by weight
Crosslinking agent: Coronate L, NPU, Japan
DBTDL: Dibutyltin dilaurate
SCA: Silane coupling agent having beta-cyanoacetyl group (M812, LG Chem)
Unit of coating solid content: wt %
Viscosity of coating solution: cP Results of evaluating physical properties with respect to Examples and Comparative Examples are shown in Table 3.

TABLE 4

|  | Example | | | Comparative Example | | |
|---|---|---|---|---|---|---|
|  | 1 | 2 | 3 | 1 | 2 | 3 |
| Interface adhesive strength (unit: gf) | 2800 | 2600 | 2100 | 1300 | 2700 | 1000 |
| Cuttability | A | A | A | C | A | A |
| Heat resistance and durability | A | A | A | B | C | C |
| Humidity and heat resistances and durability | A | A | A | B | C | C |

What is claimed is:

1. A pressure-sensitive adhesive composition, comprising: a block copolymer including a first block having a glass transition temperature of 50° C. or more and including a polymerization unit of 80 to 99.9 parts by weight of a (meth) acrylic acid ester monomer and a polymerization unit of 0.1 to 20 parts by weight of a monomer providing a crosslinkable functional group, and a second block having a glass transition temperature of −10° C. or less and including a monomer providing a crosslinkable functional group; and a multifunctional crosslinking agent, wherein the monomers providing a crosslinkable functional group included in the first and second blocks are represented by Formula 1, and the number of carbon atoms included in alkylene groups of A and B in Formula 1 of the monomer included in the second block is larger than that of the monomer included in the first block:

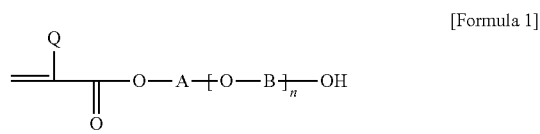

[Formula 1]

where Q is hydrogen or an alkyl group having 1 to 4 carbon atoms, A and B may be each independently a linear alkylene group, and n is a number of 0 to 10, wherein the block copolymer includes 500 to 1,500 parts by weight of the second block with respect to 100 parts by weight of the first block.

2. The composition according to claim 1, wherein the glass transition temperature of the first block is 70 to 100° C.

3. The composition according to claim 1, wherein the (meth)acrylic acid ester monomer is an alkyl methacrylate.

4. The composition according to claim 1, wherein the second block includes a polymerization unit of 80 to 99.9 parts by weight of a (meth)acrylic acid ester monomer and a polymerization unit of 0.1 to 20 parts by weight of a monomer providing a crosslinkable functional group.

5. The composition according to claim 3, wherein the (meth)acrylic acid ester monomer of the second block is an alkyl acrylate.

6. The composition according to claim 1, wherein the number of carbon atoms included in the alkylene groups of A and B of the monomer included in the first block ranges from 1 to 3, and the number of carbon atoms included in the alkylene groups of A and B of the monomer included in the second block ranges from 4 to 10.

7. The composition according to claim 1, wherein the block copolymer has a number average molecular weight of 3,000 to 300,000.

8. The composition according to claim 1, wherein the block copolymer has a polydispersity index (Mw/Mn) of 1.0 to 2.5.

9. The composition according to claim 1, wherein the block copolymer is a diblock copolymer having the first block and the second block.

10. The composition according to claim 1, wherein the multifunctional crosslinking agent is included at 0.01 to 10 parts by weight with respect to 100 parts by weight of the block copolymer.

11. A pressure-sensitive adhesive optical laminate, comprising:
   an optical film; and
   a pressure-sensitive adhesive layer formed on one or both surfaces of the optical film and including the crosslinked pressure-sensitive adhesive composition of claim 1.

12. A polarizing plate, comprising:
   a polarizer; and
   a pressure-sensitive adhesive layer formed on one or both surfaces of the polarizer, and including the crosslinked pressure-sensitive adhesive composition of claim 1.

13. A display device comprising the optical laminate of claim 11 or the polarizing plate of claim 12.

* * * * *